(12) United States Patent
King et al.

(10) Patent No.: US 9,874,106 B2
(45) Date of Patent: Jan. 23, 2018

(54) VTG LEVER POSITIVE DISPLACEMENT PRESS JOINT

(71) Applicant: BorgWarner Inc., Auburn Hills, MI (US)

(72) Inventors: Matthew King, Arden, NC (US); Elias Morgan, Leicester, NC (US); Greg Williams, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 67 days.

(21) Appl. No.: 14/919,203

(22) Filed: Oct. 21, 2015

(65) Prior Publication Data

US 2017/0114658 A1    Apr. 27, 2017

(51) Int. Cl.
*F01D 17/16*    (2006.01)
*F02C 6/12*    (2006.01)

(52) U.S. Cl.
CPC ......... *F01D 17/165* (2013.01); *F01D 17/167* (2013.01); *F02C 6/12* (2013.01); *F05D 2220/40* (2013.01); *F05D 2240/12* (2013.01)

(58) Field of Classification Search
CPC ...... F01D 17/16; F01D 17/162; F01D 17/165; F01D 17/167; F01D 9/041; F05D 2250/90; F05D 2240/12; F05D 2220/30; F05D 2220/40; F02B 37/24; F02C 6/12; B23P 15/04; Y10T 29/49337; Y10T 29/49336; Y10T 403/49; Y10T 403/4949; Y10T 403/4966
See application file for complete search history.

(56) References Cited

U.S. PATENT DOCUMENTS

| | | | | |
|---|---|---|---|---|
| 6,209,198 B1 * | 4/2001 | Lammas | ............... | F01D 17/162 29/889.22 |
| 7,080,539 B2 * | 7/2006 | Parker | ................... | B21K 1/762 29/898.048 |
| 8,083,474 B2 * | 12/2011 | Hashimoto | ........... | F01D 17/165 415/160 |
| 8,668,443 B2 * | 3/2014 | Espasa | .................. | F01D 17/165 415/160 |
| 9,017,017 B2 * | 4/2015 | Sausse | .................. | F01D 17/165 415/160 |
| 2002/0168262 A1 * | 11/2002 | Jinnai | ..................... | F01D 17/16 415/164 |
| 2006/0112690 A1 * | 6/2006 | Hemer | .................. | F01D 17/165 60/602 |
| 2010/0260597 A1 * | 10/2010 | Sausse | .................. | F01D 17/165 415/160 |
| 2015/0118029 A1 * | 4/2015 | Radke | ..................... | F02B 37/24 415/159 |

FOREIGN PATENT DOCUMENTS

EP           3085920 A1  * 10/2016
WO     WO2015092843         *  6/2015

* cited by examiner

*Primary Examiner* — Ninh H Nguyen
*Assistant Examiner* — Brian P Wolcott
(74) *Attorney, Agent, or Firm* — BrooksGroup

(57) ABSTRACT

A number of variations may include a product comprising: a vane lever comprising a first end, a second end, a top surface, and a bottom surface; an opening which extends through the second end and which is defined by an inner surface, and wherein a perimeter of the inner surface comprises a plurality of vertical flutes which extend a length of the inner surface and which are constructed and arranged to displace a material of a vane shaft.

17 Claims, 4 Drawing Sheets

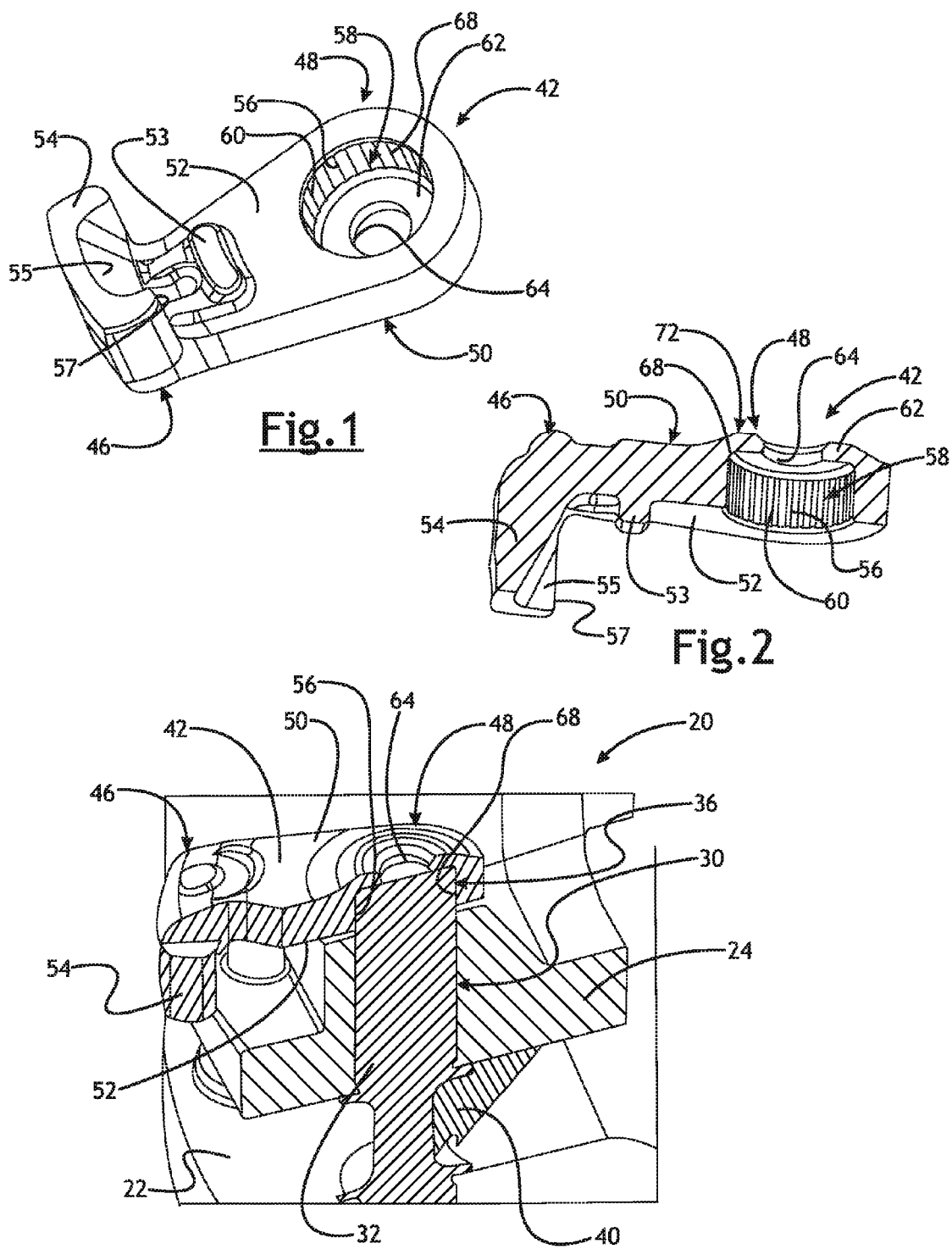

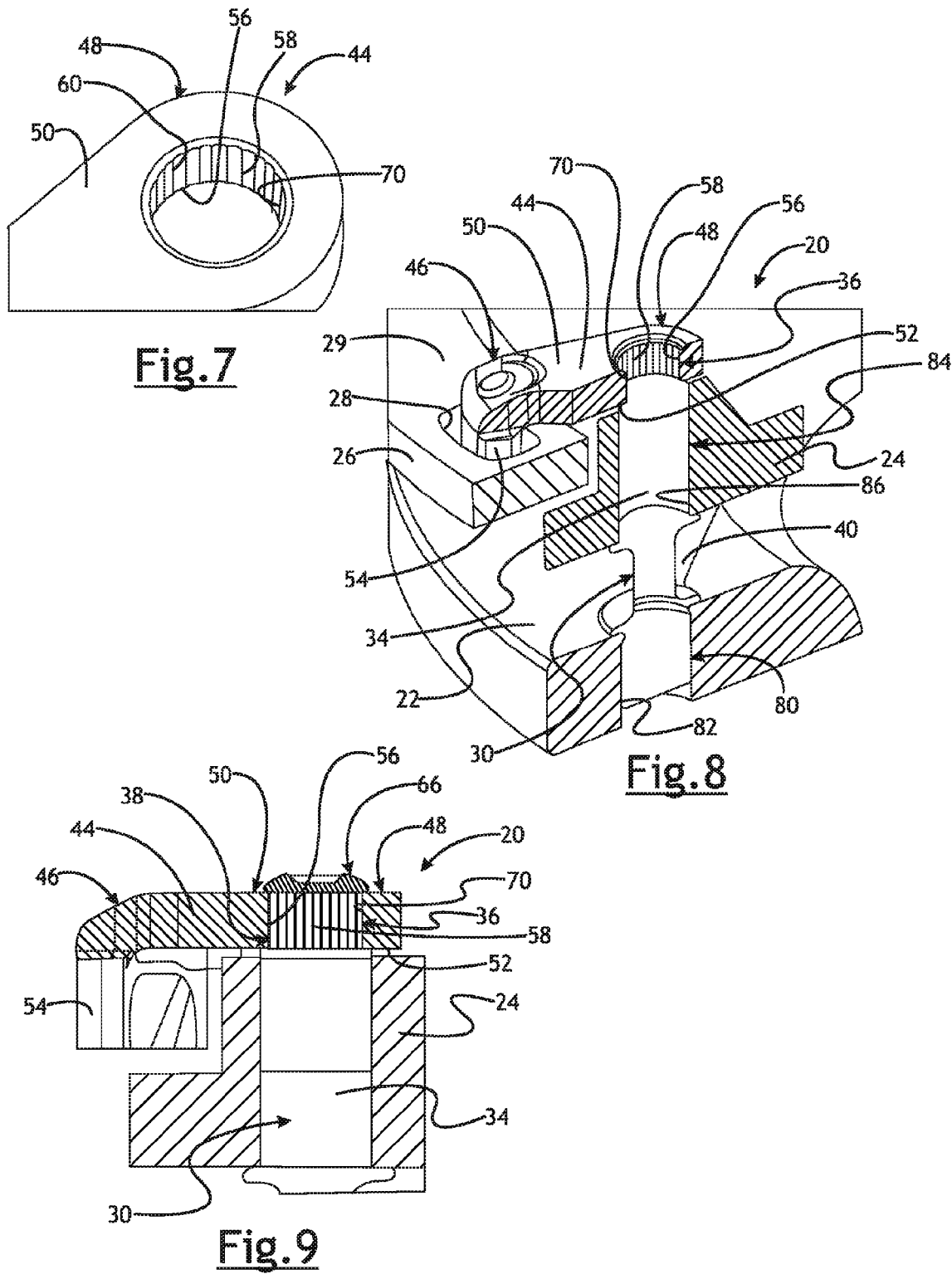

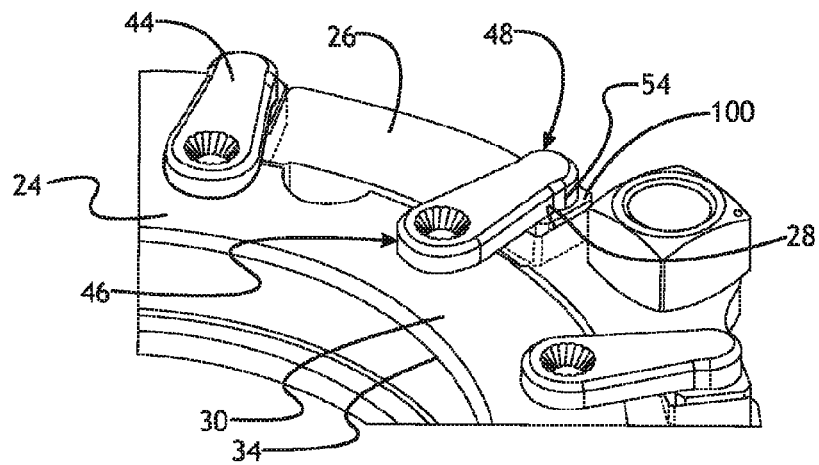
Fig.10
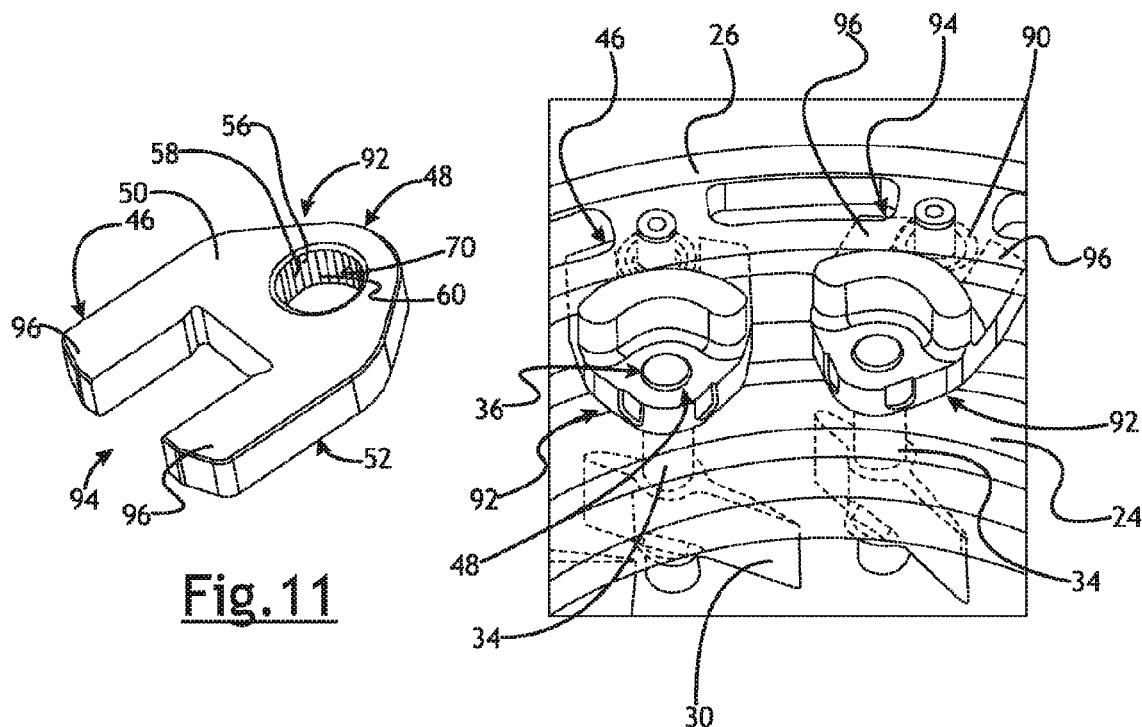
Fig.11
Fig.12

VTG LEVER POSITIVE DISPLACEMENT PRESS JOINT

TECHNICAL FIELD

The field to which the disclosure generally relates to includes vane levers for a turbine.

BACKGROUND

A turbocharger may include variable turbine geometry (VTG) using vanes in front of a turbine inlet.

SUMMARY OF ILLUSTRATIVE VARIATIONS

A number of variations may include a product comprising: a vane lever comprising a first end, a second end, a top surface, and a bottom surface; an opening which extends through the second end and which is defined by an inner surface, and wherein a perimeter of the inner surface comprises a plurality of vertical flutes which extend a length of the inner surface and which are constructed and arranged to displace a material of a vane shaft.

A number of variations may include a method to assemble a vane lever to a vane shaft comprising: providing a vane lever with an opening defined by an inner surface having a plurality of vertical flutes; and pressing the vane lever onto a vane shaft so that the inner surface extends around an outer perimeter of the vane shaft displacing a material of the vane shaft using the plurality of flutes and causing resistance to at least one of a torque or axial forces between the vane lever and the vane shaft.

A number of variations may include a method to assemble a vane pack assembly comprising: providing a plurality of vane components each having a vane shaft and a vane interposed between a lower vane ring and an upper vane ring; placing an adjustment ring onto the upper vane ring; providing a plurality of vane levers each having an opening defined by an inner surface comprising a plurality of vertical flutes; placing the plurality of vane levers onto the plurality of vane components so that the inner surfaces are aligned with an outer perimeter of the vane shafts; and pressing the plurality of vane levers onto the plurality of vane shafts so that the plurality of vertical flutes on the inner surfaces displace material on the vane shafts.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 illustrates a perspective bottom view of a vane lever according to a number of variations.

FIG. 2 illustrates a side section view of a vane lever according to a number of variations.

FIG. 3 illustrates a section view of a vane pack assembly with sections removed according to a number of variations.

FIG. 7 illustrates a close-up perspective view of a vane lever according to a number of variations.

FIG. 8 illustrates a section view of a vane pack assembly according to a number of variations.

FIG. 9 illustrates a section view of a vane pack assembly with sections removed according to a number of variations.

FIG. 10 illustrates a close-up perspective view of a vane pack assembly according to a number of variations.

FIG. 11 illustrates a perspective view of a vane lever according to a number of variations.

FIG. 12 illustrates a close-up perspective view of a vane pack assembly according to a number of variations.

DETAILED DESCRIPTION OF ILLUSTRATIVE VARIATIONS

The following description of the variations is merely illustrative in nature and is in no way intended to limit the scope of the invention, its application, or uses.

A variable turbine geometry (VTG) turbocharger may be used to expand the usable flow rate range of an engine while at the same time maintaining a high level of efficiency. A VTG turbocharger may regulate the turbine output by changing the inflow angle and the inflow speed at the turbine inlet. The change in the inflow angle and inflow speed at the turbine inlet may be done using a vane pack assembly 20, variations of which are illustrated in FIGS. 6, 8, 10, and 12.

Figure 6:
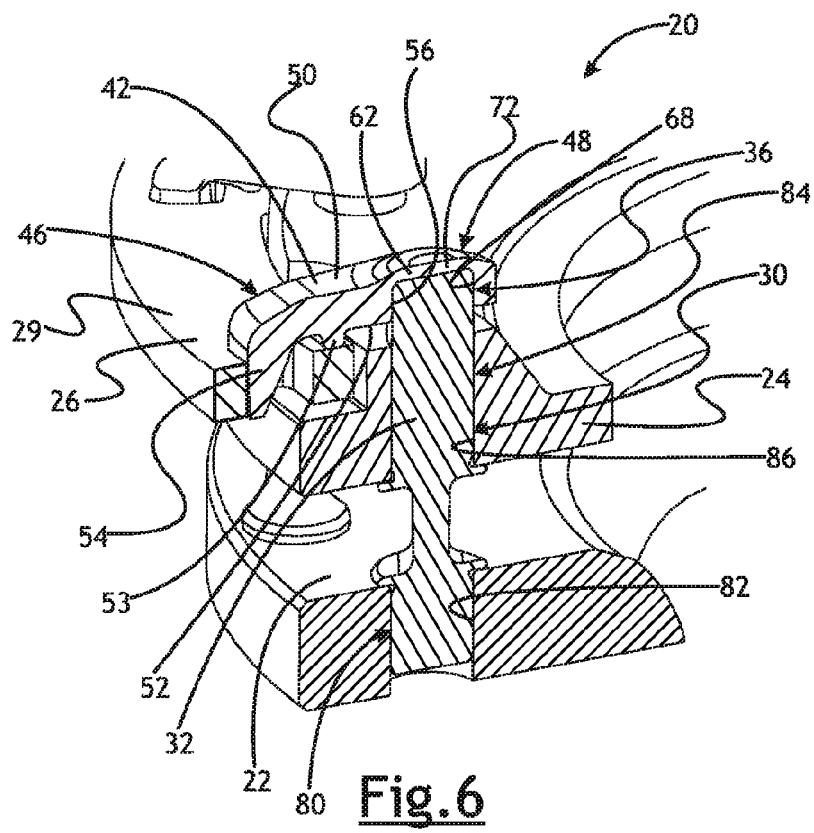
FIG. 6 illustrates a section view of a vane pack assembly according to a number of variations.

Referring to FIG. 8, in a number of variations, a vane pack assembly 20 may include a lower vane ring 22, an upper vane ring 24, and a plurality of vane components 30 interposed between the lower vane ring 22 and the upper vane ring 24. The vane components 30 may each include a vane shaft 32, 34 and a vane 40 which may rotate around the vane shaft 32, 34. A first portion 80 of the vane shaft 32, 34 may be constructed and arranged to extend within an opening 82 in the lower vane ring 22, variations of which are illustrated in FIGS. 6 and 8. A second portion 84 of the vane shaft 32, 34 may be constructed and arranged to extend through an opening 86 in the upper vane ring 24, variations of which are also illustrated in FIGS. 6 and 8. In a number of variations, an adjustment ring 26 may extend around the upper vane ring 24 and may include an attachment feature including, but not limited to, a plurality of cutouts/openings 28 constructed and arranged to accommodate a portion of a vane lever tab 54, a variation of which is illustrated in FIG. 8, or a plurality of pins 90 constructed and arranged to mate with a fork end 94 of a vane lever 92, a variation of which is illustrated in FIG. 12, as will be discussed hereafter.

In a number of variations, a plurality of vane levers 42, 44, 92 may be secured to the vane shafts 32, 34 using a positive displacement press-joint, as will be discussed hereafter. Referring to FIGS. 1, 2, 4, 5, 8, 9, and 11, in a number of variations, a vane lever 42, 44, 92 may include a first end 46, a second end 48, a top surface 50, and a bottom surface 52. In a number of variations, the vane lever 42, 44, 92 may also include an opening 56 which may extend through the second end 48 and may be defined by an inner surface 68, 70 which may include a plurality of vertical slots or flutes 58 which may be constructed and arranged to mate with and displace material of a top end 36 of a vane shaft 32, 34, as will be discussed hereafter. The first end 46 may be constructed and arranged to attach to an adjustment ring 26, as will be discussed hereafter.

Figures 4, 5:
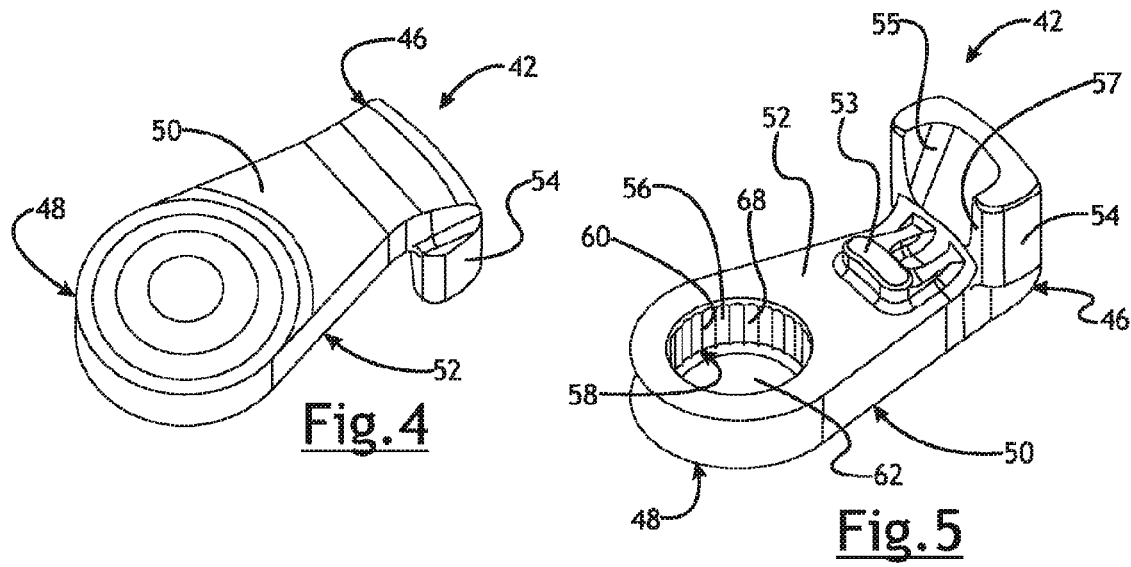
FIG. 4 illustrates a perspective top view of a vane lever according to a number of variations.
FIG. 5 illustrates a perspective bottom view of a vane lever according to a number of variations.

Referring to FIGS. 1-6, in a number of variations, the opening 56 may extend upward toward the top surface 50 and may be defined by an inner surface 68. A radial lip 62 may extend from a top end 72 of the inner surface 68. In one variation, the radial lip 62 may form a through-hole 64 which may be aligned with the center of the opening 56, variations of which are illustrated in FIGS. 1-3. The diameter of the through-hole 64 may be less than the diameter of the opening 56. In another variation, the radial lip 62 may not include a through hole, variations of which are illustrated in FIGS. 4-6. In a number of variations, the vane lever 42 may be constructed and arranged so that the top end 36 of the vane shaft 32 may be concealed within the vane lever 42, variations of which are illustrated in FIGS. 3 and 6. In a number of variations, the inner surface 68 may include a plurality of vertical slots or flutes 58 which may be dispersed circumferentially around the inner surface 68 and which may be constructed and arranged to displace material on the vane shaft 32 when the vane lever 42 is pressed onto the outer perimeter of the vane shaft 32. In a number of variations, the edges 60 of the slots or flutes 58 may cut into the material of the vane shaft 32 to cause the material displacement of the vane shaft 32.

Referring to FIGS. 7-9, and 11, in another variation, the opening 56 on the vane lever 44 may extend through the top surface 50 and the bottom surface 52 of the vane lever 44, 92 and may be defined by an inner surface 70. The inner surface 70 may include a plurality of vertical slots or flutes 58 which may be dispersed circumferentially around the inner surface 70 and which may be constructed and arranged to displace material on the vane shaft 34 when the inner surface 70 of the vane lever 44, 92 is pressed onto the outer perimeter of the vane shaft 34. In a number of variations, the edges 60 of the slots or flutes 58 may cut into the material of the vane shaft 34 to cause the material displacement of the vane shaft 34. In a number of variations, the vane shaft 34 may be constructed and arranged to include a stepped portion 38, a variation of which is illustrated in FIG. 9. The stepped portion 38 may allow a portion of the vane shaft 34 to extend above the inner surface 70 which may allow for riveting 66 of the vane shaft 34 to the vane lever 44 if desired, a variation of which is also illustrated in FIG. 9, which may further secure the vane lever 44 to the vane shaft 34.

In a number of variations, the use of slots or flutes 58 on the inner surface 68, 70 of the vane lever 42, 44, 92 for material displacement of the vane shaft 32, 34 may increase the resistance of torque and axial forces between the vane lever 42, 44, 92 and the vane shaft 32, 34. The use of slots or flutes 58 on the inner surface 68, 70 of the vane lever 42, 44, 92 may also increase the consistency of the press forces. Using the slots or flutes 58 may also eliminate the need to use a welding process to attach the vane lever 42, 44, 92 to the vane shaft 32, 34 which may allow for greater material selection of the vane pack assembly 20 components as the materials would no longer have to be compatible for welding.

Referring to FIGS. 1-5, in a number of variations, the vane lever 42, 44 may also include a tab 54 which may extend downward approximately perpendicular from the first end 46 of the vane lever 42, 44 and may be constructed and arranged to sit within an opening 28 in the adjustment ring 26. The vane lever tab 54 may also include a cutout or groove 55 on its inner surface 57. In a number of variations, the bottom surface 52 may also include a standoff 53, variations of which are illustrated in FIGS. 1, 2, and 5, which may be constructed and arranged so that it may sit on the top surface 29 of the adjustment ring 26, a variation of which is illustrated in FIG. 6. In another variation, the opening 28 in the adjustment ring 26 may include a block 100 which may be constructed and arranged to accommodate the tab 54, a variation of which is illustrated in FIG. 10.

Referring to FIGS. 11 and 12, in another variation, the first end 46 of the vane lever 92 may be constructed and arranged as a fork end 94 having a first and second protrusion 96. The fork end 94 of the vane lever 92 may be constructed and arranged to sit between the upper vane ring 24 and the adjustment ring 26 so that the first and second protrusions 96 surround a pin 90 which may be riveted or welded to the adjustment ring 26 to secure the vane lever 92 to the adjustment ring 26, a variation of which is illustrated in FIG. 12.

It is noted that any number of vane lever configurations may include any of the above vane lever opening configurations without departing from the spirit and scope of the invention. Further, any number of combinations of the attachment methods of the vane lever and the adjustment ring discussed above may be used including, but not limited to, a combination of pins and rotating blocks.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a vane lever comprising a first end, a second end, a top surface, and a bottom surface; an opening which extends through the second end and which is defined by an inner surface, and wherein a perimeter of the inner surface comprises a plurality of vertical flutes which extend a length of the inner surface and which are constructed and arranged to displace a material of a vane shaft.

Variation 2 may include a product as set forth in Variation 1 wherein the opening further includes a radial lip which extends inward from a perimeter of a top edge of the inner surface.

Variation 3 may include a product as set forth in any of Variations 1-2 wherein the radial lip includes a through hole.

Variation 4 may include a product as set forth in any of Variations 1-3 further comprising a tab which extends approximately perpendicularly downward from the first end and which is constructed and arranged to mate with an adjustment ring of a vane pack assembly.

Variation 5 may include a product as set forth in any of Variations 1-3 wherein the first end comprises a fork profile which is constructed and arranged to attach to an adjustment ring of a vane pack assembly.

Variation 6 may include a product as set forth in Variation 5 wherein the fork profile includes a first and a second protrusion which are constructed and arranged to surround a pin attached to the adjustment ring.

Variation 7 may include a product as set forth in any of Variations 1-6 further comprising a vane component comprising a vane shaft and a vane which rotates around the vane shaft, and wherein the vane lever is pressed onto the vane shaft so that a material of the vane shaft is displaced.

Variation 8 may include a product as set forth in Variation 7 wherein the vane shaft includes a stepped portion which is constructed and arranged to allow a portion of the vane shaft to extend above the vane lever.

Variation 9 may include a method to assemble a vane lever to a vane shaft comprising: providing a vane lever with an opening defined by an inner surface having a plurality of vertical flutes; and pressing the vane lever onto a vane shaft so that the inner surface extends around an outer perimeter of the vane shaft displacing a material of the vane shaft using the plurality of flutes and causing resistance to at least one of a torque or axial forces between the vane lever and the vane shaft.

Variation 10 may include a method as set forth in Variation 9 further comprising riveting the vane shaft to the vane lever.

Variation 11 may include a method to assemble a vane pack assembly comprising: providing a plurality of vane components each having a vane shaft and a vane interposed between a lower vane ring and an upper vane ring; placing an adjustment ring onto the upper vane ring; providing a plurality of vane levers each having an opening defined by an inner surface comprising a plurality of vertical flutes; placing the plurality of vane levers onto the plurality of vane components so that the inner surfaces are aligned with an outer perimeter of the vane shafts; and pressing the plurality of vane levers onto the plurality of vane shafts so that the plurality of vertical flutes on the inner surfaces displace material on the vane shafts.

Variation 12 may include a method as set forth in Variation 11 further comprising riveting the vane shafts to the vane levers.

Variation 13 may include a method as set forth in any of Variations 11-12 further comprising providing a tab on the first end of each of the vane levers which extends within the adjustment ring.

Variation 14 may include a method as set forth in any of Variations 11-13 further comprising providing a plurality of blocks within the adjustment ring which each include an opening constructed and arranged to accommodate the tab on the vane levers.

Variation 15 may include a method as set forth in any of Variations 11-12 further comprising providing a fork profile on the first end of the vane lever which is constructed and arranged to surround a pin attached to the adjustment ring.

The above description of select variations within the scope of the invention is merely illustrative in nature and, thus, variations or variants thereof are not to be regarded as a departure from the spirit and scope of the invention.

What is claimed is:

1. A product comprising: a vane lever comprising a first end, a second end, a top surface, and a bottom surface, an opening which extends through the second end and is defined by an inner surface, and wherein a perimeter of the inner surface comprises a plurality of vertical flutes each extending a length of the inner surface and wherein each vertical flute includes a cutting edge constructed and arranged to displace a material of a vane shaft when the vane lever is pressed onto the vane shaft.

2. The product of claim 1 wherein the opening further includes a radial lip which extends inward from a perimeter of a top edge of the inner surface and covers at least a portion of the opening.

3. The product of claim 2 wherein the radial lip includes a through hole.

4. The product of claim 1 further comprising a tab which extends approximately perpendicularly downward from the first end and which is constructed and arranged to mate with an adjustment ring of a vane pack assembly.

5. The product of claim 1 wherein the first end comprises a fork profile which is constructed and arranged to attach to an adjustment ring of a vane pack assembly.

6. The product of claim 5 wherein the fork profile includes a first and a second protrusion which are constructed and arranged to surround a pin attached to the adjustment ring.

7. The product of claim 1 further comprising a vane component comprising a vane shaft and a vane which rotates around the vane shaft, and wherein the vane lever is pressed onto the vane shaft so that a material of the vane shaft is displaced.

8. The product of claim 7 wherein the vane shaft includes a stepped portion which is constructed and arranged to allow a portion of the vane shaft to extend above the vane lever.

9. A method to assemble a vane lever to a vane shaft comprising:
providing a vane lever with an opening defined by an inner surface having a plurality of vertical flutes; and
pressing the vane lever onto a vane shaft so that the inner surface extends around an outer perimeter of the vane shaft and displaces a material of the vane shaft using the plurality of flutes and causing resistance to at least one of a torque or axial forces between the vane lever and the vane shaft.

10. The method of claim 9 further comprising riveting the vane shaft to the vane lever.

11. A method to assemble a vane pack assembly comprising:
providing a plurality of vane components each having a vane shaft and a vane interposed between a lower vane ring and an upper vane ring;
placing an adjustment ring onto the upper vane ring;
providing a plurality of vane levers each having an opening defined by an inner surface comprising a plurality of vertical flutes;
placing the plurality of vane levers onto the plurality of vane components so that the inner surfaces are aligned with an outer perimeter of the vane shafts; and
pressing the plurality of vane levers onto the plurality of vane shafts so that the plurality of vertical flutes on the inner surfaces displace material on the vane shafts.

12. The method of claim 11 further comprising riveting the vane shafts to the vane levers.

13. The method of claim 11 further comprising providing a tab on a first end of each of the vane levers which extends within the adjustment ring.

14. The method of claim 13 further comprising providing a plurality of blocks within the adjustment ring which each include an opening constructed and arranged to accommodate the tab on the vane levers.

15. The method of claim 11 further comprising providing a fork profile on the first end of the vane lever which is constructed and arranged to surround a pin attached to the adjustment ring.

16. A vane lever comprising a body, wherein the body includes a cavity defined by an inner cylindrical surface and an inner top surface, wherein the cavity is constructed and arranged to attach to and conceal a top portion of a vane shaft, wherein the inner cylindrical surface includes a plurality of vertical flutes each extending a length of the inner cylindrical surface and wherein each vertical flute includes a cutting edge.

17. A vane lever comprising a body, wherein the body includes a first surface and a second surface opposite of the first surface and a cavity defined by an inner cylindrical surface which extends from the second surface, and wherein the first surface extends across the entire body, and wherein the inner cylindrical surface includes a plurality of vertical flutes each extending a length of the inner cylindrical surface and wherein each vertical flute includes a cutting edge.

\* \* \* \* \*